United States Patent
Ktami et al.

(10) Patent No.: US 8,275,192 B2
(45) Date of Patent: Sep. 25, 2012

(54) COUPLING ALIGNMENT APPARATUS AND METHOD

(75) Inventors: Nader W. Ktami, Griffin, GA (US); Paul C. Pawelski, Griffin, GA (US)

(73) Assignee: Caterpillar Inc., Peoria, IL (US)

( * ) Notice: Subject to any disclaimer, the term of this patent is extended or adjusted under 35 U.S.C. 154(b) by 645 days.

(21) Appl. No.: 12/342,208

(22) Filed: Dec. 23, 2008

(65) Prior Publication Data

US 2010/0158313 A1     Jun. 24, 2010

(51) Int. Cl.
*G06K 9/00* (2006.01)
*G01B 11/26* (2006.01)

(52) U.S. Cl. .......................... 382/152; 356/153

(58) Field of Classification Search .............. 356/139.04–139.09, 144, 152.1, 356/152.2, 138, 153; 382/141, 152
See application file for complete search history.

(56) References Cited

U.S. PATENT DOCUMENTS

| | | | | |
|---|---|---|---|---|
| 4,709,485 A | * | 12/1987 | Bowman | 33/228 |
| 5,026,998 A | * | 6/1991 | Holzl | 250/559.37 |
| 5,077,905 A | * | 1/1992 | Murray, Jr. | 33/412 |
| 5,684,578 A | | 11/1997 | Nower et al. | |
| 5,980,094 A | | 11/1999 | Nower | |
| 6,040,903 A | * | 3/2000 | Lysen et al. | 356/153 |
| 7,242,465 B2 | * | 7/2007 | Lacko et al. | 356/153 |
| 7,312,861 B2 | * | 12/2007 | Loen | 356/138 |
| 7,486,390 B2 | * | 2/2009 | Suing et al. | 356/153 |
| 2004/0196452 A1 | * | 10/2004 | Chapman et al. | 356/153 |
| 2007/0253002 A1 | * | 11/2007 | Hermann | 356/614 |

FOREIGN PATENT DOCUMENTS

KR    20030014042    2/2003

* cited by examiner

*Primary Examiner* — Michael A Lyons

(57) ABSTRACT

An apparatus for axially aligning a first coupling member and a second coupling member that can be connected so as to form a rotating assembly. The apparatus includes a measurement arrangement configured to be mounted onto the first coupling member and to be rotated therewith. The measurement arrangement includes an emitter arrangement configured to emit first and second signals in the direction of the second coupling member so as to cause at least a portion of said first and second signals to be reflected by the second coupling member. The measurement apparatus further has a capture arrangement configured to capture at least a portion of the first and second reflected signals. The apparatus includes a control arrangement configured to determine an offset in axial alignment between the first and second coupling member based on at least the first and second reflected signals.

20 Claims, 4 Drawing Sheets

COUPLING ALIGNMENT APPARATUS AND METHOD

TECHNICAL FIELD

This disclosure relates to a method and an apparatus for aligning multiple coupling members. More specifically, but not exclusively, it relates to aligning two coupling members for forming a rotatable coupling assembly.

BACKGROUND

When a prime mover such as an internal combustion engine, turbine, or electric motor is used to power a driven device such as a generator, propeller driveshaft, compressor, or a transmission, some form of coupling is necessary to connect the rotating output of the prime mover to the rotatable input of driven device. In an ideal situation, the centerline of the rotating output of the prime mover will be coaxial to the centerline of the rotatable input of the driven device when both devices are in their normal operating condition. In most large machinery situations, it is not possible to achieve a situation close enough to the ideal to prevent machine damage without utilizing some form of flexible coupling. Even when a flexible coupling is used, it is desirable to come close to the ideal alignment to prolong the life of the coupling, prevent torsional or linear vibration problems in the machinery, and reduce the amount of energy lost as heat generated from flexing the coupling.

U.S. Pat. No. 5,684,578 to Nower et al. disclosed a laser alignment head system having two laser heads that replace the more traditional mechanical feelers. One laser head scans a first of two coupled shafts and the second laser head scans the second shaft. Data is then manipulated to determine any misalignment between the two shafts. However, this arrangement tends to be expensive and difficult to use in close coupled arrangements wherein any radial and axial clearances are usually insufficient to accommodate such cumbersome laser head system.

The traditional solution to this problem has been to align some non-rotating components on both sides of the coupling and rely on tight manufacturing tolerances in the components to ensure alignment of the rotating components. This method has two inherent problems. The first problem is that it requires the machining and assembly tolerances of up to several dozen components to be very tight so that their total tolerance stack up does not result in the rotating components being out of alignment by an unacceptable amount even when the non-rotating components are aligned. The second problem is that it does not provide positive proof of alignment. This is especially important when either of the components to be coupled are manufactured in a different location than where they are assembled. For example, if an engine manufacturer changes the allowable run out on the flywheel housing face and does not inform the generator set ("genset") assembler, a genset made after the change may not have proper alignment of the rotating components even though the genset assembler continues to perform the alignment of the non-rotating components in the same manner which previously produced acceptable results.

SUMMARY OF THE INVENTION

In a first aspect there is disclosed a method for axially aligning first and second coupling members in a rotatable assembly comprising placing the rotatable assembly in a first orientation and directing a first signal portion from a signaling arrangement, such as an emitter arrangement, towards the second coupling member such that the first signal portion is being reflected from the second coupling member. A first image is captured with an image capturing arrangement whereby the first image includes at least a portion of the second coupling member and the reflected first signal portion. The rotatable assembly is then placed in a second orientation and a second signal portion is directed from the signaling arrangement towards the second coupling member such that the second signal portion is being reflected from the second coupling member. A second image is captured with the image capturing arrangement, the second image including at least a portion of the second coupling member and the reflected second signal portion. A data set is generated wherein the data set is indicative of the relative position of the first and second coupling members based on at least the first and second images and an axial offset between the first and second coupling members is determined based on the determined difference in said generated data.

In a second aspect there is disclosed a measurement arrangement for aligning first and second coupling members forming a rotatable apparatus comprising a signaling arrangement configured to direct a plurality of signal portions towards the second coupling member so as reflect the plurality of signal portions from the second coupling member and an image capturing arrangement configured to capture a plurality of images at various rotational orientations of the rotatable coupling assembly. The plurality of images includes at least a portion of the second coupling member and at least some of the plurality of signal portions respectively. At least one of signaling arrangement and the image capturing arrangement is configured to be rotatable with the coupling assembly. The arrangement further comprises a control arrangement configured to determine any differences between the plurality of images and determine an axial offset between the first and second coupling members based on the determined differences.

DETAILED DESCRIPTION

Figure 1:
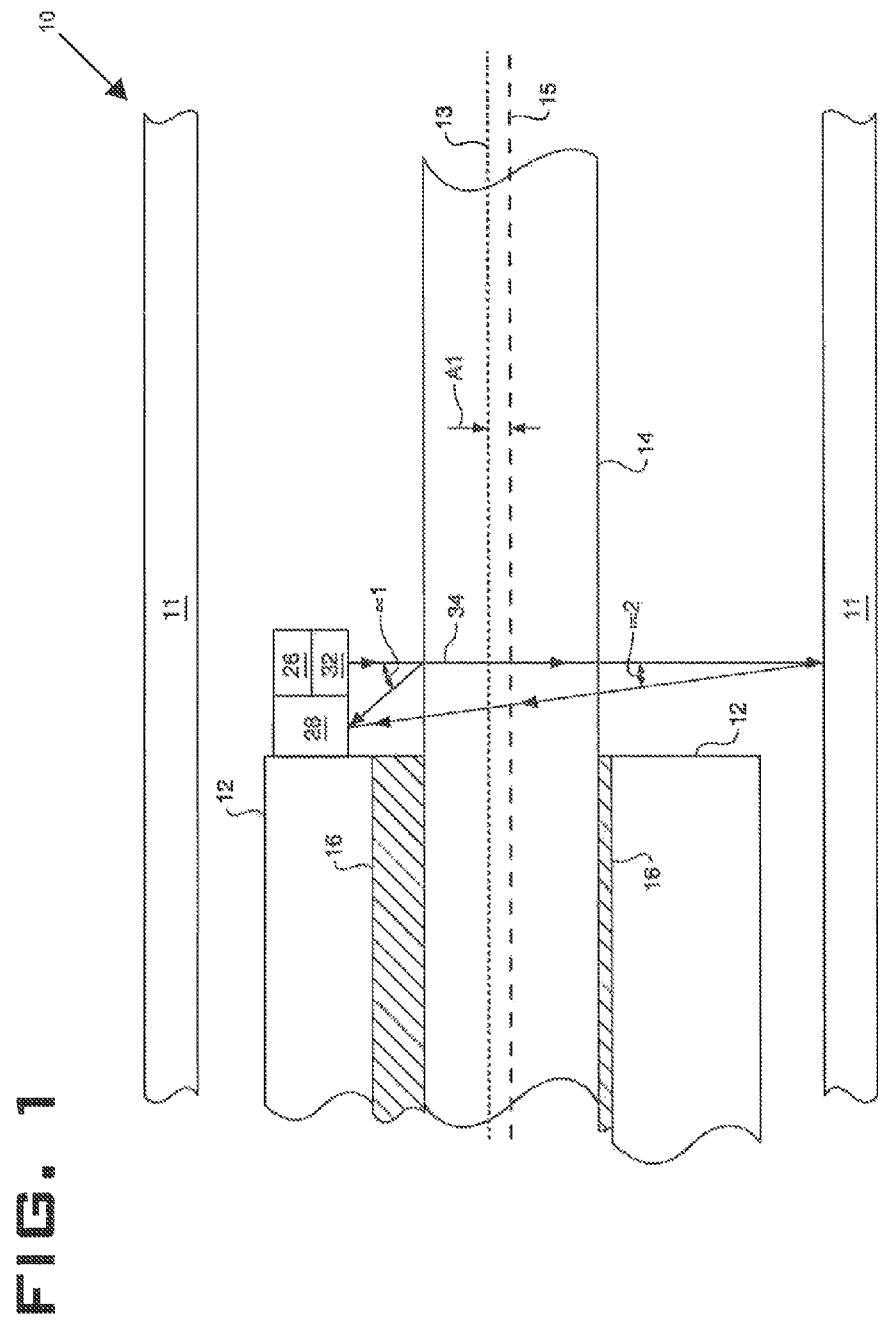
FIG. 1 shows a schematic side view representation of a coupling assembly provided with an embodiment of the coupling alignment tool in accordance with the current disclosure.

Referring to FIG. 1 there is shown a schematic coupling assembly 10. The coupling assembly 10 may include a first coupling member 12 and a second coupling member 14. The coupling assembly 10 may represent any suitable coupling such as for example between a prime mover like a combustion engine, a turbine or a motor and a driven component such as a generator, a pump or a transmission. For the purposes of this disclosure the first and second coupling members 12, 14 may be coupled in any suitable arrangement such as for example a male-female coupling, a splined coupling, a flanged coupling, a bolted coupling etc. A flexible coupling portion 16 may be interposed between the first and second coupling members 12,14 to allow for misalignment between the first and second coupling members 12, 14. The flexible coupling portion may for example include an elastomeric component, mechanical springs or a fluidic coupler.

The coupling assembly 10 may at least partially be surrounded by coupling support 11 to provide direct or indirect support to the coupling assembly and/or to provide a safety barrier to shield the coupling assembly 10. In one embodiment the coupling support is a cage-like structure surrounding the coupling assembly 10. For clarity only some portions of the coupling support 11 are shown in FIG. 1.

The first coupling member 12 may have a first axis of rotation 13 and the second coupling member may have a second axis of rotation 15. In the exemplary illustration of FIG. 1 the first and second axes of rotation do not coincide and therefore display an offset misalignment A1 which may at least partially and/or temporarily be accommodated by the flexible coupling portion 16. The issue of misalignment will be discussed in greater depth later on.

Figure 2:
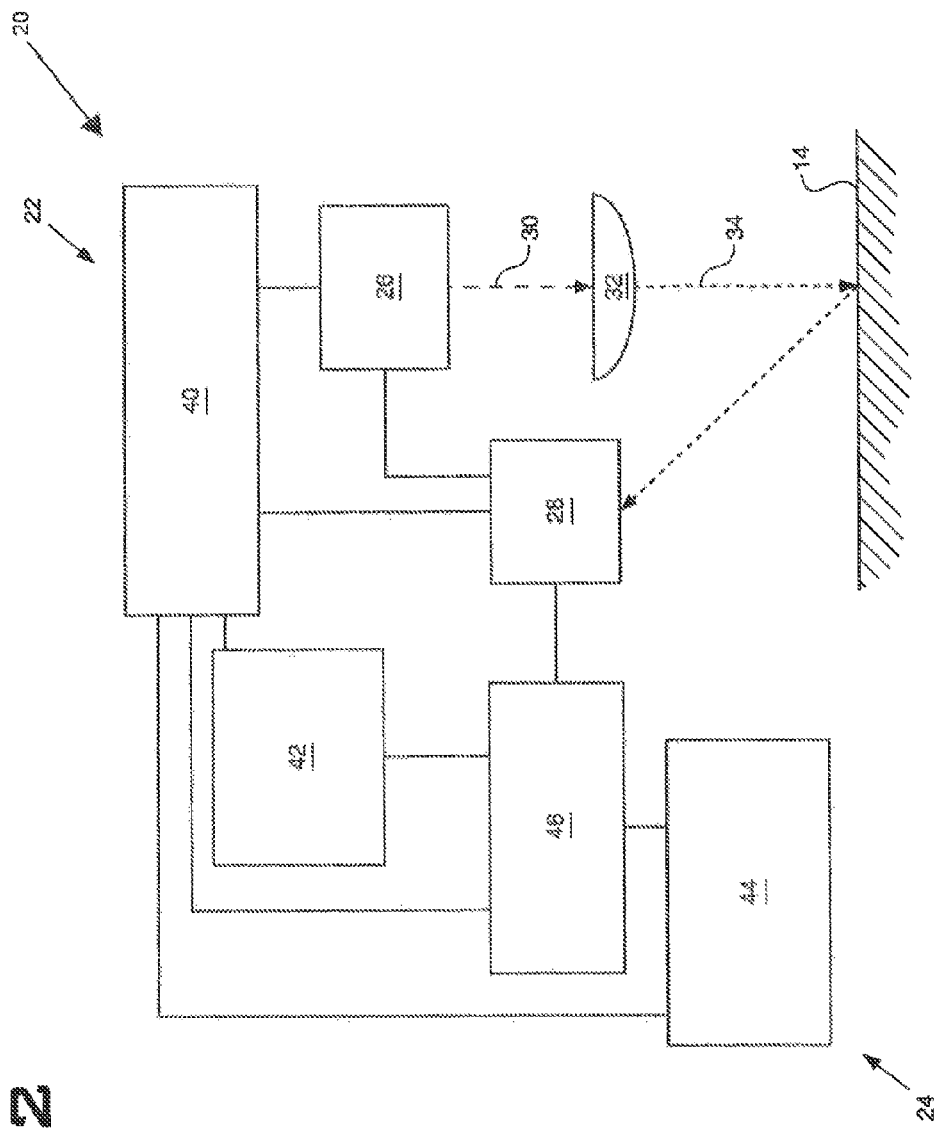
FIG. 2 shows a diagrammatic representation of the coupling alignment tool of FIG. 1.

FIG. 2 shows an embodiment of an alignment tool 20. In one embodiment the alignment tool may include a measurement arrangement generally designated with the numeral 22, a control arrangement generally designated with the numeral 24 and a power supply 40. The measurement arrangement 22 and the control arrangement 24 may be two discrete portions, but they may also be closely interlinked and/or share common components. The power supply 40 may be any suitable source at any suitable location and may be common for the measurement and control arrangements 22, 24 or it may be individual.

In one embodiment the measurement arrangement 22 may include an emitter arrangement 26 and a capture arrangement 28. The emitter arrangement 26 may be one or a plurality of sources of any suitable kind of signal and may for example emit at least one optical signal, other electro-magnetic signal or audio signal. A coherent light source such as a laser or laser diode may be preferred to obtain clear signals.

The capture arrangement 28 may be configured to capture images relating to at least a portion of the second coupling member 14 and/or to directly or indirectly capture signals emitted by the emitter arrangement 26. The capture arrangement 28 may comprise a single or a plurality of capturing devices. In one embodiment the capture arrangement 28 comprises at least one camera.

In one embodiment both the emitter arrangement 26 and the capture arrangement 28 are mounted onto the first coupling member 12.

In one embodiment the emitter arrangement 26 may be configured to send a light beam 30 through an optical lens 32 to spread the light beam laterally. The laterally spread light beam will from hereon be referred to as the light plane 34.

In one embodiment at least one surface of the optical lens 32 may be provided with an etched cross-hatching arrangement.

The emitter arrangement 26 and/or the optical lens 32 may be arranged such that the light plane is directed generally towards the second coupling member 14. In one embodiment the light plane 34 is directed towards the second coupling member 14 such that the angle between the light plane 34 and the second axis of rotation 15 would be a substantially right angle if no substantial misalignment existed between the first and second coupling members 12 and 14. At least a portion of the light plane 34 may be reflected by the second coupling portion 14. The capture arrangement 28 is arranged such that it captures at least a portion of the light plane that is being reflected from the second coupling portion at an angle ($\alpha 1$) relative to the light plane 34. In other words, the capture arrangement 28 may capture at least a portion of the reflected signal at an incline ($\alpha 1$) relative to the direction of the signal before it was reflected.

The capture arrangement 28 may be arranged relative to the emitter arrangement 26 such that suitable angles $\alpha_n$ are achieved. It is to be understood that greater angles $\alpha$ may provide a better resolution, but that smaller angles $\alpha$ may be preferred where space constraints are an issue.

The measurement arrangement 22 may further include a positional device 42 configured to provide information regarding the rotation of at least a portion of the second coupling member relative to the first coupling member. In one embodiment the positional device 42 may include a two or three axis DC accelerometer and/or gyroscope.

The control arrangement 24 may include an electronic processing unit 44 and a communications structure 46. Any components of the control arrangement 24 may be located as preferred, either on the second coupling member or separate thereof. The communications structure 46 may include both wired and wireless components and may be connected with various portions of the measurement and control arrangements 22, 24. In one embodiment the communications structure 46 may include a CAN bus. In one embodiment the communications structure 46 may include a Zigbee radio link.

INDUSTRIAL APPLICABILITY

During the preparation for, or after initial assembly of the coupling assembly 10 the first and second coupling portions 12, 14 may not be in a preferred alignment. In one example the two coupling portions 12, 14 may display offset misalignment whereby their axes of rotation run substantially parallel to each other but do not coincide. In another example the two coupling portions 12,14 may also display angular misalignment whereby the two axes of rotation do not run parallel to each other. In a third example the two coupling portions 12, 14 may simultaneously display offset and angular misalignment.

An exemplary method of operating an embodiment of the alignment tool 20 will now be explained in more detail below.

An emitter arrangement 26, in this particular example a light source, an optical lens 32 and a capture arrangement 28 are attached to the first coupling member 12 such that the light plane 34 strikes the second coupling member 14 when the emitter arrangement is activated. A portion of the light plane that does not strike the second coupling member 14 may strike other components of or near the coupling assembly 10 such as for example the coupling support 11 or a floor surface.

Figure 3A:
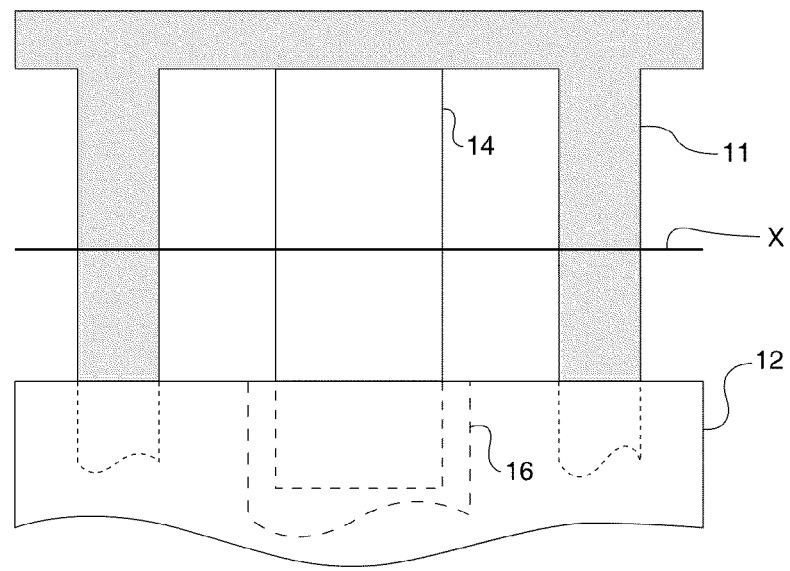
FIG. 3 shows a diagrammatic plan view of the coupling assembly of FIG. 1
Figure 3B:
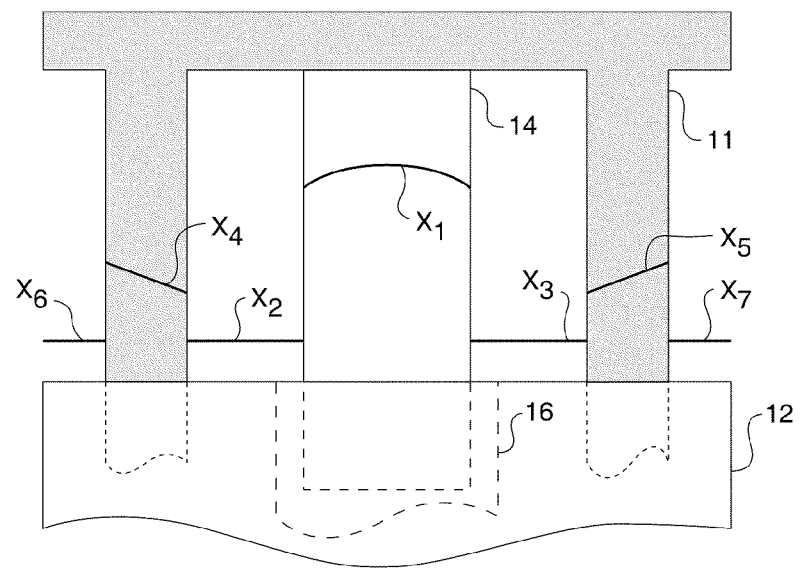

When seen from a location in the light plane 34 as in FIG. 3A, the locations where the light strikes the other objects forms a continuous line (X). However, when viewed, like the capture arrangement 28 does, from a slight angle as shown in FIG. 3B, the line breaks up into a series of segments ($X_1, X_2, X_3, X_4, X_5, X_6, X_7$), having different angles $\alpha$, such as $\alpha 1$ and $\alpha 2$, based on the distance to and the shape of the object which intersects the light path. Using the convention that the emitter arrangement 26 is above the top of the capture arrangement 28, the further down in the capture arrangement image the line X is seen, the further the surface reflecting the line is from the capture arrangement 28. Where the objects do not touch each other, the line segments do not connect. Therefore, the line segment $X_1$ on the second coupling member 14 will form a slight curve with distinct ends since the next object which will intersect the light plane 34 is at a different distance from the emitter arrangement 26.

In one method the alignment tool 20 is activated and the first and second coupling members 12, 14 are slowly rotated through at least a partial or a complete revolution. At multiple times during the revolution, the electronic processing unit 44 signals the capture arrangement 28 through the communications structure 46. The capture arrangement 28 may capture a first image $P1_a$ at a first relative position of the first and second coupling members 12 and 14 and at a later stage may capture a second image $P2_a$ at a second relative position of the first and second coupling members 12 and 14. The images are sent to the electronic processing unit 44 along with rotational position information from the positional device 42 through the communications structure 46.

In an embodiment wherein the capture arrangement 28 has multiple capturing devices the alignment tool 20 may be activated and signal the capture arrangement 28 through the communications structure 46. The capture arrangement 28 may capture first and second images $P1_a$ and $P2_a$ from different positions relative to the second coupling member 14. The images are sent to the electronic processing unit 44 through the communications structure 46.

In one embodiment two images $P1_a$ and $P2_a$ may be taken when the first and second coupling members 12 and 14 are in the same orientation relative to each other. During the capture of the first image $P1_a$ the emitter arrangement 26 may be active, whilst during the capturing of the second image $P2_a$ the emitter arrangement may be inactive or vice versa. A pixel by pixel subtraction between the first and second images $P1_a$ and $P2_a$, for example a pixel by pixel subtraction of the first image $P1_a$ from the second image $P2_a$ (or vice versa) may remove at least a portion or substantially everything from the result except the reflected light (line segments $X_{1-7}$).

Parameters indicative of the location of the line segment across the second coupling member 14 relative to a fixed vertical and horizontal reference can be calculated for each image pair. In one embodiment the parameters may for example be based on the location of the ends of the line segment $X_1$. By observing the change in these values, the linear and angular offset of the first coupling member 12 to the second coupling member 14 can be determined.

In one embodiment the method includes determining and/or refining the vertical position of points on the line segment based on the amount of light in adjacent pixels in a given column and using it to enhance linear offset calculations. The line formed by the beam of light striking an object will be wider than one pixel with a normal distribution of energy perpendicular to the line. By measuring the light level of the brightest pixel in a column as well as the light level in several adjacent pixels, above and below it in the same column and fitting the results to a normal distribution curve, a sub-pixel estimate of the vertical location of that part of the line segment can be made. Variations in the reflectivity of the second coupling member 14 will cause the result for any given column to be off from the actual location. However, the variation in reflectivity can also be considered to be random and normally distributed so a least squares curve fit of the line segment $X_1$ through the points of maximum brightness to an ellipse (i.e. a second degree polynomial) will result in a highly accurate estimate of the vertical locations of the ends of the line segments $X_1$. Using these points in the measurement described above may result in increased accuracy of the measurement of distance from the emitter arrangement 26 and/or the capture arrangement 28 on the surface of the first coupling member 12 to the center of the second coupling member 14 at each measurement point. Knowing that the distance (d) must vary sinusoidally as the measurement point rotates, a least squares fit of all the distance (d) values can be made which provides additional refinement of the estimate. Assigning arbitrary 0 and 90 degree rotation positions, vertical and horizontal linear offset can be provided.

Any suitable point may be used as a reference point for any calculations observation, determinations etc. In the exemplary method below the reference point may be regarded as being a reference line $R_1$ and/or $R_2$.

Figure 4:
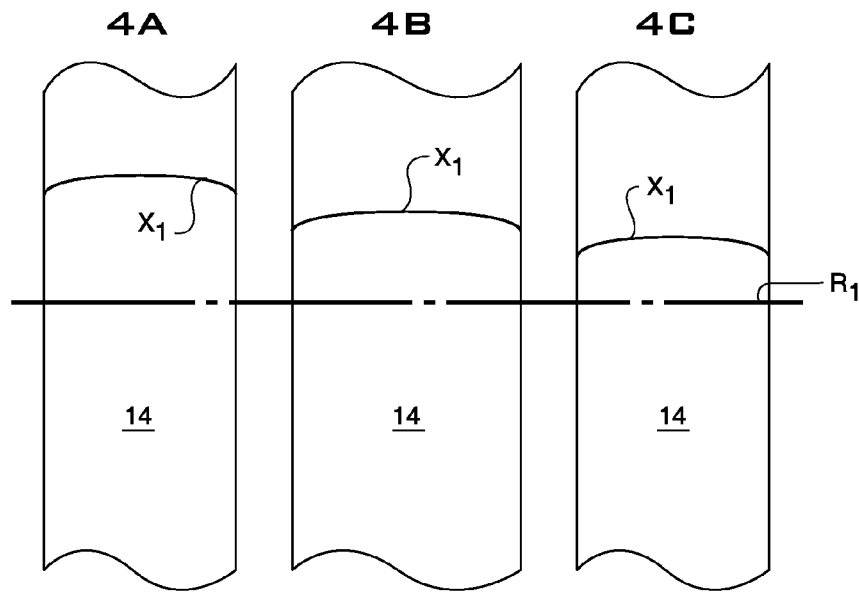
FIGS. 4A-4C show representations of a coupling member having an offset misalignment.

FIGS. 4A-4C show the effect of a linear offset of the second coupling member 14 relative to the first coupling member 12. FIG. 4A shows the second coupling member 14 as it would appear when viewed from the side where it is closest to the outside of the part of the first coupling member 12 where the capture arrangement 28 is attached. FIG. 4B shows the second coupling member 14 as it would appear when viewed from 90 degrees away from FIG. 4A and FIG. 4C shows the second coupling member 14 as it would appear 180 degrees from FIG. 4A. Reference line $R_1$ is at the same location in the field of view of the capture arrangement 28 in all three FIGS. 4A-4C. For the sake of simplicity, it is assumed that the reference line $R_1$ represents the bottom of the field of view. Note that the distance from the reference line to the ends of the line segment $X_1$ is maximum in FIG. 4A where the second coupling member 14 is closest to the outside of the first coupling member 12 on the side where the capture arrangement 28 is attached. Conversely it is minimum in FIG. 4C where the second coupling member 14 is furthest from the side of the first coupling member 12 where the capture arrangement 28 is attached. Also note that the horizontal distance between the ends of the line segment $X_1$ is maximum in FIG. 4A and minimum in FIG. 4B.

Figure 5:
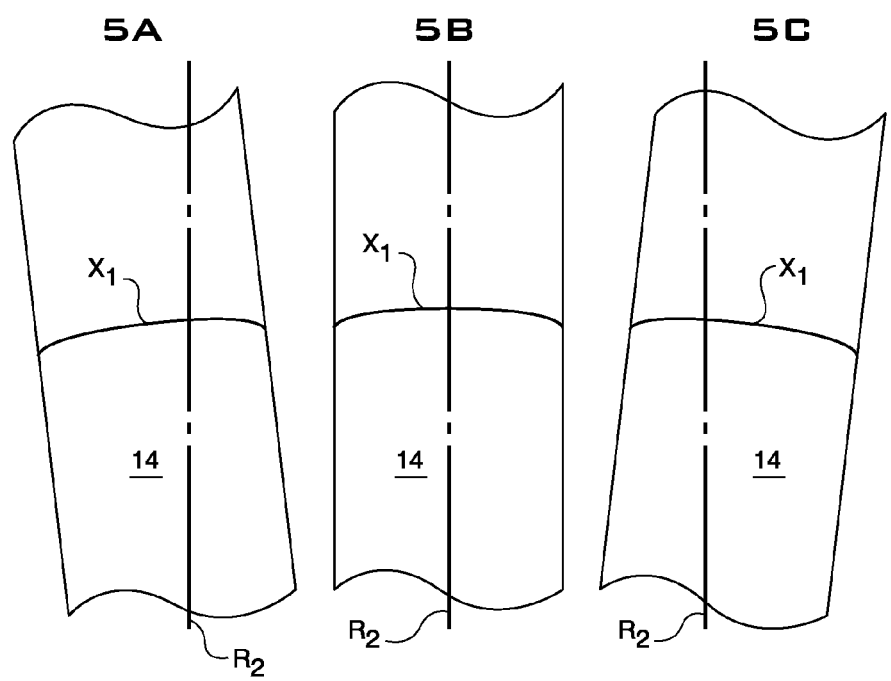
FIGS. 5A-5C show representations of a coupling member having an angular misalignment.

FIGS. 5A-5C show the effect of an angular offset of the second coupling member 14 relative to the first coupling member 12. FIG. 5A shows the second coupling member 14 as it would appear when viewed from the side where it appears to have maximum positive angle relative to a vertical reference line $R_2$. For the sake of simplicity, it is assumed that the reference line $R_2$ is in the exact middle of the field of view of the capture arrangement 28. FIG. 5B shows the second coupling member 14 as it appears when viewed from 90 degrees away from FIG. 5A and FIG. 5C shows the second coupling member 14 as it would appear 180 degrees from FIG. 5A. Note that the distance from the left end of the line segment $X_1$ to the reference line $R_2$ is maximum in FIG. 5A and minimum in FIG. 5C while the distance from the right end of the line segment $X_1$ to the reference line $R_2$ is minimum in FIG. 5A and maximum in FIG. 5C.

In one embodiment the distances between the reference lines $R_1$, $R_2$ and the ends of the line segment $X_1$ may be calculated by counting the number of pixels those points are vertically from the bottom of the image and horizontally from the centerline of the image respectively.

In one embodiment Bayesian methods may be used to take into account all of the information available from all of the images taken during a full rotation of the first coupling member 12 and the second coupling member 14 to improve the estimates of linear and angular offset.

In one embodiment the method includes determining and/or refining the angle of the shaft based on geometry and curve fit. The light projected from the optical lens 32 forms a planer wedge therefore, the intercept of the light beam with the cylindrical of the second coupling member 14 forms a ellipse with the semi-minor axis equal to the radius (r) of the second coupling member 14 and the semi-major axis equal to the radius divided by the cosine of the angle (alpha) between the light plane and the cross-sectional plane of the second coupling member 14. Utilizing projection geometry, it is possible to determine exactly how a given ellipse would appear from any vantage point. Note that any projection of an ellipse is still an ellipse. This is why the curve fit described in the previous paragraph was possible independent of the calculations described in this paragraph. Variables needed for that calculation are the angle (beta) between the observation point and the plane containing the line segment that is known, the distance from the observation point to the center of the ellipse (d), which is a bounded by the physical structure of the system and provided as a highly accurate estimate from the previous calculations. Therefore, it is possible to create a curve fit of the observed points on the line segment $X_1$ at any measurement point using the least squares method. Knowing that the measurements were taken from locations on an exact circle, it is possible to do a least squares fit of each of the variables in all the measurements to solve for angle alpha and its rotation relative to the arbitrary 0 degree point with a high degree of accuracy. Therefore, an accurate estimate of vertical and horizontal angular offset can be provided.

In one embodiment the optical lens 32 may be modified to increase the amount of data going into the Bayesian calculations. By etching lines in the surface of the optical lens 32 the projected light can be changed from a simple line segment X to a line segment with crosshatches at regular intervals. This may provides two enhancements. First, pixel columns capturing the reflected light from the crosshatch will have more data available to do the curve fit which identifies the center of the line. Second, the distance between any two crosshatches can be used to define the ends of an elliptical line segment. Since the distance between any two line segments when the light it projected on a flat surface parallel to the capture arrangement 28 face is known as is the radius (r) of the second coupling member 14 onto which the light is being projected, the measurement of the horizontal distances can be used to calculate both the distance (d) to the second coupling member 14 and its offset to the left or right in a particular field of view.

In one embodiment the control arrangement 24 may provide an indication for a corrective action to at least partially compensate for any axial offset. For example, the control arrangement 24 may provide information about, or suggest, a corrective action such as an angular or linear change in position for at least one of the first and second coupling members 12, 14.

Although the preferred embodiments of this disclosure have been described herein, improvements and modifications may be incorporated without departing from the scope from the following claims.

What is claimed is:

1. A method for axially aligning first and second coupling members in a rotatable assembly, comprising:
   placing the rotatable assembly in a first orientation;
   directing a first signal portion from a signaling arrangement towards the second coupling member such that the first signal portion is being reflected from the second coupling member;
   capturing a first image with an image capturing arrangement, the first image including at least a portion of the second coupling member and the reflected first signal portion;
   placing the rotatable assembly in a second orientation;
   directing a second signal portion from the signaling arrangement towards the second coupling member such that the second signal portion is being reflected from the second coupling member;
   capturing a second image with the image capturing arrangement, the second image including at least a portion of the second coupling member and the reflected second signal portion;
   generating a data set indicative of the relative position of the first and second coupling members based on at least the first and second images; and
   determining an axial offset between the first and second coupling members based on a determined difference in said generated data.

2. A method according to claim 1, further comprising placing at least one of the signaling arrangement and the image capturing arrangement in first and second orientations corresponding to the first and second orientations of the rotatable assembly.

3. A method according to claim 1, further comprising placing both the signaling arrangement and the image capturing arrangement in first and second orientations corresponding to the first and second orientations of the rotatable assembly.

4. A method according to claim 1, further comprising capturing a third image including at least a portion of the second coupling member, the third image being captured with the rotatable assembly being substantially in the first orientation and the signaling arrangement being substantially inactive.

5. A method according to claim 4, further comprising capturing a fourth image including at least a portion of the second coupling member, the fourth image being captured with the rotatable assembly being substantially in the second orientation and the signaling arrangement being substantially inactive.

6. A method according to claim 5, wherein generating a data set indicative of the relative position of the first and second coupling members based on at least the first and second images further comprises generating said data set based on the first, second, third and fourth images.

7. A method according to claim 6, wherein generating a data set indicative of the relative position of the first and second coupling members further comprises performing a pixel-by-pixel subtraction between the first and third images and between the second and fourth images.

8. A method according to claim 1, further comprising determining at least one parameter indicative of a location of at least one of a first and second line segments, observing any change in calculated locations between the first and second line segments and determining any linear and/or axial offset between the first and second coupling members based on the observations.

9. A method according to claim 8 wherein determining at least one parameter indicative of the location of at least one of the first and second line segments comprises counting a number of horizontal and/or vertical pixels between a point on at least one of the first and second line segments and at least one reference point.

10. A method according to claim 9 wherein determining at least one parameter indicative of the location of at least one of the first and second line segments comprises determining a light level of at least one pixel.

11. A method according to claim 1, further comprising using Bayesian methods to improve determining any linear and/or axial offset between the first and second coupling members.

12. A method according to claim 1, further comprising creating first and second optical ellipses and comparing any differences in the shapes of the first and second ellipses.

13. A method according to claim 1, further comprising indicating a corrective action to at least partially compensate the axial offset.

14. A measurement arrangement for aligning first and second coupling members forming a rotatable assembly comprising:

a signaling arrangement configured to direct a plurality of signal portions towards the second coupling member so as reflect the plurality of signal portions from the second coupling member;

an image capturing arrangement configured to capture a plurality of images at various rotational orientations of the rotatable assembly, the plurality of images including at least a portion of the second coupling member and at least some of the plurality of signal portions;

at least one of the signaling arrangement and the image capturing arrangement being configured to be rotatable with the rotatable assembly; and a control arrangement configured to:
   determine any differences between the plurality of images; and
   determine an axial offset between the first and second coupling members based on the determined differences.

15. The measurement arrangement according to claim 14, wherein at least one of the signaling arrangement and the image capturing arrangement is mounted on the first coupling member such that the first coupling member and the at least one of the signaling arrangement and the image capturing arrangement are rotatable together.

16. The measurement arrangement according to claim 14, wherein the image capturing arrangement captures at least a portion of the reflected signals at an incline ($\alpha$) relative to a direction of the signal before it was reflected.

17. The measurement arrangement according to claim 14, wherein the signaling arrangement is configured to emit at least one optical signal and the image capturing arrangement is a camera.

18. The measurement arrangement according to claim 17, further comprising an optical lens configured to capture the optical signal and to spread the optical signal into a light plane.

19. The measurement arrangement according to claim 18, wherein a surface of the optical lens is provided with an etched cross-hatching arrangement.

20. The measurement arrangement according to claim 14, wherein the measurement arrangement further includes at least one of an accelerometer and a gyroscope capable of transmitting data regarding a rotational orientation of the rotatable assembly.

* * * * *